US012586867B2

(12) United States Patent
Kim et al.

(10) Patent No.: US 12,586,867 B2
(45) Date of Patent: Mar. 24, 2026

(54) POROUS COMPOSITE SEPARATOR FOR SECONDARY BATTERY AND LITHIUM SECONDARY BATTERY INCLUDING THE SAME

(71) Applicant: SK INNOVATION CO., LTD., Seoul (KR)

(72) Inventors: Jeong Han Kim, Daejeon (KR); Whee Sung Kim, Daejeon (KR); Yun Kyung Jo, Daejeon (KR); Jae Woong Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 943 days.

(21) Appl. No.: 17/688,209

(22) Filed: Mar. 7, 2022

(65) Prior Publication Data

US 2022/0285788 A1     Sep. 8, 2022

(30) Foreign Application Priority Data

Mar. 8, 2021     (KR) ........................ 10-2021-0030133

(51) Int. Cl.
*H01M 50/446*     (2021.01)
*H01M 4/62*     (2006.01)
*H01M 10/0525*     (2010.01)

(52) U.S. Cl.
CPC ......... *H01M 50/446* (2021.01); *H01M 4/623* (2013.01); *H01M 10/0525* (2013.01)

(58) Field of Classification Search
CPC . H01M 50/446; H01M 4/623; H01M 10/0525
USPC ........................................................ 429/129
See application file for complete search history.

(56) References Cited

U.S. PATENT DOCUMENTS

| | | | |
|---|---|---|---|
| 10,680,291 B2 | 6/2020 | Saeki et al. | |
| 2012/0247336 A1* | 10/2012 | Zhou | B01D 53/228 |
| | | | 423/709 |
| 2020/0335755 A1* | 10/2020 | Zhang | H01M 50/403 |

FOREIGN PATENT DOCUMENTS

| | | | | |
|---|---|---|---|---|
| CN | 108666509 A | * | 10/2018 | |
| JP | 2002-198024 A | | 7/2002 | |
| JP | 2008146963 A | * | 6/2008 | ............ Y02E 60/10 |
| KR | 10-2014-0014304 A | | 2/2014 | |
| KR | 10-2015-0091897 A | | 8/2015 | |
| KR | 10-2015-0108040 A | | 9/2015 | |
| KR | 10-1716907 B1 | | 3/2017 | |
| KR | 10-2019-0110249 A | | 9/2019 | |
| WO | WO-2005038946 A2 | * | 4/2005 | ......... H01M 10/052 |
| WO | WO-2015119306 A1 | * | 8/2015 | ............ H01M 2/145 |

OTHER PUBLICATIONS

Extended European Search Report for the European Patent Application No. 22160611.4 issued by the European Patent Office on Jul. 25, 2022.
Office Action for Korean Patent Application No. 10-2021-0030133 issued by the Korean Intellectual Property Office (KIPO) on Jun. 4, 2025.

* cited by examiner

*Primary Examiner* — Allison Bourke
*Assistant Examiner* — Robert Gene West
(74) *Attorney, Agent, or Firm* — IP & T GROUP LLP

(57)     ABSTRACT

Provided are a composite separator for a secondary battery and a lithium secondary battery including the same, and specifically, a composite separator for a secondary battery showing excellent physical properties such as thermal safety and electrochemical safety, and a lithium secondary battery including the separator are provided.

18 Claims, No Drawings

POROUS COMPOSITE SEPARATOR FOR SECONDARY BATTERY AND LITHIUM SECONDARY BATTERY INCLUDING THE SAME

CROSS-REFERENCE TO RELATED APPLICATIONS

This application claims priority under 35 U.S.C. § 119 to Korean Patent Application No. 10-2021-0030133, filed on Mar. 8, 2021, in the Korean Intellectual Property Office, the disclosure of which is incorporated herein by reference in its entirety.

TECHNICAL FIELD

The following disclosure relates to a porous composite separator for a secondary battery and a lithium secondary battery including the same.

BACKGROUND

A separator is a porous film disposed between a positive electrode and a negative electrode of a battery, and pores inside the film are impregnated with an electrolyte to provide a migration channel of lithium ions. In addition, the separator is a subsidiary material which prevents an internal short circuit of a positive electrode and a negative electrode even when a battery temperature is too high or external shock is applied, and plays an important role in securing battery safety. A separator for a secondary battery which has been the most used to date is a microporous thin film made of a polyethylene, which is thinned with higher strength by stretching and has fine and uniform holes by a separation phenomenon with a plasticizer.

Recently, as the use of a lithium secondary battery expands, a demand for a larger area and a higher capacity is on the rise. With the higher capacity of a secondary battery, an electrode plate area is increased and a larger amount of positive electrode or negative electrode active material is used in the same area, and thus, a problem arose in battery safety.

Thus, there is a growing demand for improvement of characteristics of a separator for high strength, high permeability, and thermal stability of the separator and electrical safety of a secondary battery during charge and discharge. A lithium secondary battery requires high mechanical strength for improvement of safety during a battery production process and the use thereof, and requires high thermal safety.

For example, when thermal safety of the separator is lowered, an inter-electrode short circuit due to damage or deformation of the separator caused by a temperature rise in the battery may occur, so that a risk of overheating or fire of the battery increases.

In addition, with a higher capacity and a higher output of the lithium secondary battery, improvement of mechanical strength such as puncture strength of a separator for a lithium ion secondary battery is demanded in terms of safety. However, when the separator is thinned by the higher capacity, the mechanical properties such as puncture strength and tensile strength of the separator itself are deteriorated, which causes a problem in battery safety. In particular, when conventional separators are provided for a stack type secondary battery in which a plurality of positive electrodes and negative electrodes cut into a predetermined sized unit are sequentially stacked with the separator interposed therebetween, alignment defects occur, and thermal shrinkage, puncture strength, and the like are significantly low, resulting in lack of battery safety. Various attempts have been made in order to solve the problems, but there is no commercialized solution which is satisfactory enough so far.

In order to solve the problem, Korean Patent Registration Patent No. 10-1476040 discloses a separator integrated with a coating film including a gas adsorbent, and Korean Patent Laid-Open Publication No. 10-2015-0091897 discloses a separator in which a coating layer including inorganic particles, a binder, and a gas adsorbent is formed on a porous substrate, but since high temperature storage characteristics and mechanical strength are insufficient and a problem of lacking a gas adsorption amount occurs, improvement is demanded.

In particular, development of a technology to improve safety and physical properties of a separator and a battery according to excellent high temperature storage characteristics, high puncture strength, excellent life retention rate of a battery, and the like even in the case of a larger area and a higher capacity being achieved, is demanded.

RELATED ART DOCUMENTS

Patent Documents (Patent Document 0001) Korean Patent Registration Publication No. 10-1476040 (Dec. 17, 2014)
(Patent Document 0002) Korean Patent Laid-Open Publication. No. 10-2015-0091897 (Aug. 12, 2015)

SUMMARY

An embodiment of the present invention is directed to providing a porous composite separator having excellent physical properties and safety even with a larger area and a higher capacity than a conventional separator for a secondary battery, and a battery including the porous composite separator.

In particular, an embodiment of the present invention is directed to providing a porous composite separator having improved thermal safety with low thermal shrinkage.

Another embodiment of the present invention is directed to providing a porous composite separator having excellent battery safety such as high temperature storage characteristics and penetration properties.

Another embodiment of the present invention is directed to providing a porous composite separator having significantly improved battery safety by preventing occurrence of an internal short circuit caused by damage of a separator in a secondary battery with excellent puncture strength.

Another embodiment of the present invention is directed to providing a porous composite separator having a significantly improved gas adsorption amount under a low moisture content.

Still another embodiment of the present invention is directed to providing a porous composite separator having excellent energy density of a positive electrode active material of a battery including the porous composite separator.

In one general aspect, a porous composite separator includes: a porous substrate; and a porous coating layer formed by coating one or both surfaces of the porous substrate with a slurry including a gas adsorbent and a binder.

Here, the gas adsorbent may be a gas adsorbent coated or adsorbed with an inorganic acid.

In an exemplary embodiment of the present invention, the inorganic acid may be included at 0.1 wt % or more based on 100 wt % of the gas adsorbent.

In an exemplary embodiment of the present invention, the inorganic acid may be any one or a mixture of two or more selected from hetero inorganic acids including fluorine, sulfur, nitrogen, and the like.

In an exemplary embodiment of the present invention, the gas adsorbent may be any one or a mixture of two or more selected from porous carbon materials, porous metal organic frameworks, porous silica gel, and zeolites.

In an exemplary embodiment of the present invention, an average size of the gas adsorbent may be 5 μm or less.

In an exemplary embodiment of the present invention, an average size of pores inside the gas adsorbent may be 50 nm or less.

In an exemplary embodiment of the present invention, a specific surface area of the gas adsorbent by BET measurement may be 50 m$^2$/g or more.

In an exemplary embodiment of the present invention, a $CO_2$ adsorption amount of the gas adsorbent measured at 25° C. under 1 atm may be 50 cc/g or more.

In an exemplary embodiment of the present invention, the porous coating layer may be applied on 80% or more of an area of the porous substrate.

In an exemplary embodiment of the present invention, the binder may be any one or a mixture of two or more selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, and polyvinyl alcohol.

In an exemplary embodiment of the present invention, the porous composite separator may have a thickness of 5 to 100 μm.

In an exemplary embodiment of the present invention, the porous composite separator may have a thermal shrinkage of 5% or less as measured at 150° C.

In an exemplary embodiment of the present invention, the porous composite separator may have a puncture strength of 450 gf or more as measured in accordance with the measurement method of ASTM D3763-02.

In an exemplary embodiment of the present invention, the number of charge and discharge cycles of the porous composite separator until SOH of a battery including the porous composite separator is 70% is 1000 or more.

In another general aspect, a lithium secondary battery includes the porous composite separator.

In an exemplary embodiment of the present invention, an energy density of the positive electrode active material of the lithium secondary battery may be 400 Wh/g or more.

Other features and aspects will be apparent from the following detailed description, the drawings, and the claims.

DETAILED DESCRIPTION OF EMBODIMENTS

Hereinafter, a porous composite separator for a secondary battery according to the present invention and a lithium secondary battery including the same will be described in detail.

Herein, unless otherwise defined, all technical terms and scientific terms have the same meanings as those commonly understood by one of those skilled in the art to which the present invention pertains. The terms used herein are only for effectively describing a certain specific example, and are not intended to limit the present invention. Further, unless otherwise stated, the unit of added materials herein may be wt %.

In addition, the singular form used in the specification and claims appended thereto may be intended to also include a plural form, unless otherwise indicated in the context.

The present invention provides a porous composite separator of a new concept which may show excellent thermal safety, high temperature storage characteristics, electrochemical safety, and the like at the same time, as compared with a polyolefin-based separator which is conventionally used as a common separator for a battery.

The porous composite separator has improved thermal resistance, and thus, may prevent ignition or rupture due to an abnormal phenomenon such as a rapid temperature rise. In addition, when included in a battery, the porous composite separator has excellent high temperature storage characteristics, penetration properties, and life retention rate, thereby significantly improving safety and performance of the battery.

In addition, the porous composite separator has excellent puncture strength to prevent occurrence of an internal short circuit due to damage of a separator in a battery, thereby significantly improving battery stability.

In addition, the porous composite separator allows selective adsorption of gas under a low moisture content, thereby having a significantly improved gas adsorption amount.

In addition, a battery including the porous composite separator has very high energy density of a positive electrode active material, thereby significantly improving battery performance.

Hereinafter, the present invention will be described in more detail.

The porous composite separator according to an exemplary embodiment of the present invention may include: a porous substrate; and a porous coating layer formed by coating one or both surfaces of the porous substrate with a slurry including a gas adsorbent and a binder.

Here, the gas adsorbent may be coated or adsorbed with an inorganic acid.

According to the present invention, the porous composite separator formed by forming a porous coating layer including a gas adsorbent and a binder without separate inorganic particles on one or both surfaces of the porous substrate, wherein the gas adsorbent is coated or adsorbed with an inorganic acid, and a battery including the separator have excellent thermal resistance and puncture strength, thereby having significantly improved ignition or rupture prevention ability in overcharge and heat exposure, penetration properties, battery life retention rate, and the like, maintaining the shape and physical properties of the battery excellent even in the case of allowing the battery to stand at a high temperature for a long time, and significantly improving a gas adsorption amount since the gas adsorbent may selectively absorb only gas without increasing a moisture content.

In the present invention, the inorganic acid may be included at 0.1 wt % or more, preferably 0.5 wt % or more, and more preferably 1 wt % or more, based on 100 wt % of the gas adsorbent. Specifically, the inorganic acid may be included at 0.1 to 5 wt %, preferably 0.5 to 5 wt %, and more preferably 1 to 5 wt %, but is not necessarily limited thereto.

In the present invention, the inorganic acid includes a heteroatom which is a component different from the gas adsorbent, and the kind is not limited as long as it satisfies the effect according to the present invention.

Here, it is more preferred that the inorganic acid is any one or a mixture of two or more including a heteroatom selected from fluorine, sulfur, nitrogen, and the like, for deriving the effect according to the present invention, but this is only a non-limiting example, and the present invention is not necessarily limited thereto.

In the present invention, the gas adsorbent is not limited as to in which way of physical adsorption or chemical adsorption, the adsorption is performed, and may be used as long as it has gas absorption ability.

The gas adsorbent may be, as an example, any one or a mixture of two or more selected from porous carbon materials, porous metal organic frameworks, porous silica gel, and zeolites, but is not necessarily limited thereto.

Here, the average size of the gas adsorbent may be 5 μm or less, preferably 3 μm or less, and more preferably 1 μm or less. Specifically, the size may be 0.1 to 5 μm, preferably 0.1 to 3 μm, and more preferably 0.1 to 1 μm, but is not necessarily limited thereto.

In the present invention, an average size of pores inside the gas adsorbent may be 50 nm or less, preferably 30 nm or less, and more preferably 10 nm or less. Specifically, the average size may be 1 to 50 nm, preferably 1 to 30 nm, and more preferably 1 to 10 nm, but is not necessarily limited thereto.

In the present invention, a specific surface area of the gas adsorbent by BET measurement may be 50 $m^2/g$ or more, preferably 100 $m^2/g$ or more, and more preferably 500 $m^2/g$ or more. Specifically, the specific surface area may be 50 to 3000 $m^2/g$, preferably 100 to 3000 $m^2/g$, and more preferably 500 to 3000 $m^2/g$, but is not necessarily limited thereto.

In the present invention, the gas adsorbent may have an adsorption amount of $CO_2$ of 50 cc/g or more, preferably 70 cc/g or more, and more preferably 80 cc/g or more, as measured at 25° C. under 1 atm. Specifically, the adsorption amount may be 50 to 1000 cc/g, preferably 70 to 1000 cc/g, and more preferably 80 to 1000 cc/g, but is not necessarily limited thereto.

In the present invention, the porous coating layer may be applied on 80% or more, preferably 90% or more, and more preferably 95% or more of an area of the porous substrate. Specifically, the porous coating layer may be applied on 80 to 99.9%, preferably 90 to 99.9%, and more preferably 95 to 99.9% of the area of the porous substrate, but is not necessarily limited thereto.

When the porous coating layer is not uniformly formed on the porous substrate, a portion where the coating layer is thin is vulnerable to thermal shrinkage to have poor safety, and a portion where the coating layer is thick has a problem of a nonuniform impregnation amount of an electrolyte by pressure of shrinkage and expansion of an electrode. However, the porous coating layer according to the present invention may be uniformly formed on the porous substrate, and thus, does not show the above problems.

In the present invention, any porous substrate which is uniformly coated with the porous coating layer may be used without limitation as long as it gas high porosity so that lithium ions may migrate between the two electrodes, The porous substrate as such is one commonly used in the art, and mostly includes a polyolefin porous substrate represented by polyethylene or polypropylene and may include porous substrates made of other various materials. Specifically, the porous substrate may be any one or a mixture of two or more selected from polyethylene (high-density polyethylene, low-density polyethylene, linear low-density polyethylene, high molecular polyethylene, and the like), polypropylene, polypropylene terephthalate, polyethylene terephthalate, polybutylene terephthalate, polyester, polyacetal, polyamide, polycarbonate, polyimide, polyamideimide, polyetherimide, polyetheretherketone, polyethersulfone, polyphenylene oxide, polyphenylene sulfide, and polyethylene naphthalate, but is not necessarily limited thereto.

The porous substrate may have a thickness of 50 μm or less, preferably 30 μm or less, and more preferably 10 μm or less. Specifically, the thickness may be 1 to 50 μm, preferably 1 to 30 μm, and more preferably 1 to 10 μm, but is not necessarily limited thereto.

The porous substrate may have a porosity of 30% or more, preferably 50% or more, and more preferably 80% or more. Specifically, the porosity may be 30 to 95%, preferably 50 to 95%, and more preferably 80 to 95%, but is not necessarily limited thereto.

The porous substrate may have a gas permeability of 500 sec/100 ml or less, preferably 300 sec/100 ml or less, and more preferably 200 sec/100 ml or less. Specifically, the gas permeability may be 1 to 500 sec/100 ml, preferably 1 to 300 sec/100 ml, and more preferably 1 to 200 sec/100 ml, but is not necessarily limited thereto.

In the present invention, the binder may be used without limitation as long as it is a commonly used polymer binder. The usable binder may include any one or a mixture of two or more selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, and polyvinyl alcohol, and water soluble or oil soluble binders other than the binders used in the art, and the present invention is not limited to those binders.

The porous composite separator according to the present invention may have a thickness of 100 μm or less, preferably 50 μm or less, and more preferably 30 μm or less. Specifically, the thickness may be 5 to 100 μm, preferably 5 to 50 μm, and more preferably 5 to 30 μm, but is not necessarily limited thereto.

In addition, a standard deviation of the thickness of the porous composite separator may be 1 μm or less, preferably 0.5 μm or less, and more preferably 0.1 μm or less. Specifically, the standard deviation of the thickness may be 0.01 to 1 μm, preferably 0.01 to 0.5 μm, and more preferably 0.01 to 0.1 μm, but is not necessarily limited thereto.

In the present invention, the porous composite separator may have a thermal shrinkage at 150° C. of 5% or less, preferably 3% or less, and more preferably 1% or less. Specifically, the thermal shrinkage may be 0.1 to 5%, preferably 0.1 to 3%, and more preferably 0.1 to 1%, but is not necessarily limited thereto. Since the separator has a low thermal shrinkage, ignition or rupture due to an abnormal phenomenon such as a rapid temperature rise in a lithium secondary battery may be prevented.

In the present invention, the porous composite separator may have a puncture strength of 420 gf or more, preferably 450 gf or more, and more preferably 500 gf or more, as measured in accordance with the measurement method of ASTM D3763-02. Specifically, the puncture strength may be 420 to 1,000 gf, preferably 450 to 1,000 gf, but is not necessarily limited thereto. When the separator has excellent puncture strength, damage of the separator by physical shock such as penetration or pressing is prevented to prevent an internal short circuit of a secondary battery and improve battery safety.

In the present invention, the number of charge and discharge cycles until SOH (aging state) of a battery including the porous composite separator is 70% may be 1000 or more, preferably 1200 or more, and more preferably 1300 or more. The number of cycles may be specifically 1000 to 2000 (charge conditions: CC/CV conditions of 1 C/4.12 V, 1.00 A cut-off, discharge conditions: CC conditions of 1 C, 2.90 V cut-off).

Therefore, the porous composite separator according to the present invention and the battery including the same have excellent thermal resistance and puncture strength, thereby having significantly improved ignition or rupture prevention ability in overcharge and heat exposure, penetration properties, battery life retention rate, and the like, maintaining the shape and physical properties of the battery excellent even in the case of allowing the battery to stand at a high temperature for a long time, and significantly improving a gas adsorption amount since the gas adsorbent may selectively absorb only gas without increasing a moisture content.

Another exemplary embodiment of the present invention provides a lithium secondary battery including the porous composite separator described above. The lithium secondary battery may be produced by including the porous composite separator according to an exemplary embodiment of the present invention, a positive electrode, a negative electrode, and an electrolyte solution.

When the porous composite separator according to the present invention is used in the production process of the battery as described above, an energy density of the positive electrode active material of the battery may be 400 Wh/g or more, preferably 500 Wh/g or more, and more preferably 600 Wh/g or more. Specifically, the energy density may be 400 to 1000 Wh/g, preferably 500 to 1000 Wh/g, and more preferably 600 to 1000 Wh/g, but is not necessarily limited thereto.

Hereinafter, the present invention will be described in more detail with reference to the Examples and Comparative Examples. However, the following Examples and Comparative Examples are only an example for describing the present invention in more detail, and do not limit the present invention in any way.

[Method of Measuring Physical Properties]

(1) Measurement of Gas Adsorption Amount

The gas adsorption amount was measured according to a BET measurement method.

(2) Measurement of Thermal Shrinkage at 150° C.

In a method of measuring the thermal shrinkage of separators produced in the examples and the comparative examples at 150° C., a composite separator was cut into a square shape with 10 cm on each side to produce a sample, and the area of the sample before experiment was measured using a camera and recorded. Five sheets of paper were placed on and beneath the sample, respectively so that the sample was positioned at the center, and the four sides of the paper were clipped. The sample wrapped in paper was allowed to stand in a hot-air drying oven at 150° C. for 1 hour. Thereafter, the sample was taken out and the area of the separator was measured with a camera to calculate the shrinkage by the following Calculation Formula 1:

Shrinkage (%)=(area before heating−area after heating)×100/area before heating  [Calculation Formula 1]

(3) Measurement of Pin Puncture Strength

A method of measuring pin puncture strength of a separator follows the standard of ASTM D3763-02, and the measurement was performed three times for each sample, and the average value thereof was taken.

(4) Evaluation of Lifetime

Secondary batteries including the separators produced in the examples and the comparative examples were repeatedly charged and discharged using a charger/discharger until SOH was 70%. Charge proceeded under the CC/CV conditions of 1 C/4.12 V, 1.00 A cut-off, discharge proceeded under the CC conditions of 1 C, 2.90 V cut-off, and the number of charge and discharge cycles until SOH was 70% was measured and shown.

(5) Evaluation of High Temperature Storage Characteristics

Secondary batteries including the separators produced in the examples and the comparative examples were allowed to stand in an oven at 60° C. for 20 weeks, and then a battery change was measured.

(6) Evaluation of Overcharge Characteristics

Secondary batteries including the separators produced in the examples and the comparative examples were charged to 5 V at a current density of 20 A (1.0 C), and then maintained in a stage of 5 V CV for 1 hour and 30 minutes to measure a battery change with overcharge.

(7) Evaluation of Penetration

Secondary batteries including the separators produced in the examples and the comparative examples were completely charged to SOC (charge rate) of 80%, and then evaluation of nail penetration was performed. Here, the diameter of the nail was 3.0 mm, and the penetration speed of the nail was all set at 80 mm/min.

(8) Evaluation of Heat Exposure

Secondary batteries including the separators produced in the examples and the comparative examples were placed in an oven, heated at 5° C./min, and after reaching 130° C., allowed to stand for 1 hour to measure a battery change.

Example 1

Production of Porous Composite Separator

An aqueous monofluorophosphoric acid solution was evenly sprayed on zeolite (average size: 1 μm, average pore size: 5 nm) by a spray, and dried to produce zeolite coated with fluorine. A content of fluorine relative to zeolite at this time was 1 wt %. 45 wt % of zeolite coated with fluorine as a gas adsorbent, 5 wt % of polyvinylidene fluoride (PVdF) as a binder, and 50 wt % of acetone as a solvent were mixed to produce a slurry. The entire area of both surfaces of a polyethylene porous substrate (thickness: 9 μm, porosity: 40%, permeability: 130 sec/100 ml) was uniformly coated with the thus-produced slurry to produce a porous composite separator, and the physical properties are shown in the following Table 1.

After drying the slurry, a thickness of one surface of the porous coating layer was about 3 μm, and a thickness of the separator was 15 μm on average with a standard deviation of 0.5 μm.

Production of Lithium Secondary Battery

1) Production of Positive Electrode 94 wt % of $LiCoO_2$ as a positive active material, 2.5 wt % of polyvinylidene fluoride as an adhesive, and 3.5 wt % of Super P (Imerys) as a conductive agent were added to N-methyl-2-pyrrolidone (NMP) as an organic solvent, and stirring was performed to produce a uniform positive electrode slurry. An aluminum foil having a thickness of 30 μm was coated with the slurry, dried at a temperature of 120° C., and pressed to produce a positive electrode plate having a thickness of 150 μm.

2) Production of Negative Electrode 95 wt % of artificial graphite as a negative electrode active material, 3 wt % of acrylic latex (BM900B, solid content: 20 wt %) having Tg of –52° C., and 2 wt % of carboxymethyl cellulose (CMC) as a thickener were added to water as a solvent, and stirring was performed to produce a uniform negative electrode slurry. A copper foil having a thickness of 20 μm was coated with the slurry, dried at a temperature of 120° C., and pressed to produce a negative electrode plate having a thickness of 150 μm.

3) Production of Battery

The positive electrode, the negative electrode, and the porous composite separator produced above were used to assemble a pouch type battery, and to each assembled battery, an electrolyte solution in which 1M lithium hexafluorophosphate (LiPF$_6$) was dissolved in ethylene carbonate (EC)/ethyl methyl carbonate (EMC)/dimethyl carexcept that the polyethylene porous substrate was coated with the produced slurry in a grid pattern so that 60% of the substrate area was covered.

Comparative Example 2

A porous composite separator and a lithium secondary battery were produced in the same manner as in Example 1, except that the produced slurry was applied on a cellulose nonwoven fabric (thickness: 20 μm) instead of the polyethylene porous substrate.

Comparative Example 3

A porous composite separator and a lithium secondary battery were produced in the same manner as in Example 1, except that zeolite with an uncoated surface was used instead of the fluorine-coated zeolite as the gas adsorbent to produce a slurry.

TABLE 1

| | Physical properties of separator | | | Results of battery evaluation | | | | |
| | | | | Lifetime at room | High | | | |
| | Gas adsorption amount (cc/g) | Thermal shrinkage (%) at 150° C. | Puncture strength (gf) | temperature (number of cycles until SOH of 70%) | temperature storage (60° C., 20 weeks) | Overcharge | Nail penetration | Heat exposure (130° C., 1 hour) |
|---|---|---|---|---|---|---|---|---|
| Example 1 | 80 | 2 | 450 | 1300 | Normal | Normal | Normal | Normal |
| Example 2 | 80 | 2 | 450 | 1200 | Normal | Normal | Normal | Normal |
| Comparative Example 1 | 80 | 10 | 410 | 500 | Normal | Ignite | Ignite | Ignited |
| Comparative Example 2 | 80 | 0 | 130 | 900 | Normal | Ignited | Ignited | Leaked |
| Comparative Example 3 | 45 | 1 | 400 | 900 | Pouch opened | Leaked | Leaked | Leaked | bonate (DMC)=3:5:2 (volume ratio) was injected to produce a lithium secondary battery. In order to seal the opening of an aluminum packaging material, heating sealing at 165° C. was performed to close an aluminum exterior to produce a pouch lithium secondary battery of 2000 mAh. The physical properties of the obtained lithium secondary battery are shown in the following Table 1.

Example 2

A porous composite separator and a lithium secondary battery were produced in the same manner as in Example 1, except that an aqueous sulfuric acid was sprayed instead of the aqueous monofluorophosphoric acid and sulfur-coated zeolite was used instead of fluorine-coated zeolite to produce a slurry.

Comparative Example 1

A porous composite separator and a lithium secondary battery were produced in the same manner as in Example 1, As seen in the above Table 1, it was confirmed that the porous composite separator according to the present invention had an excellent gas adsorption amount, a low thermal shrinkage, and a high puncture strength, and the battery including the separator also had significantly improved room temperature life and high temperature storage characteristics and its stability was maintained even in the case of overcharge, nail penetration, or heat exposure.

In particular, according to Example 2, even when zeolite was coated with sulfur, not fluorine, it was confirmed that the excellent physical properties of the porous and the battery including the same were maintained, and thus, it was confirmed that when the gas adsorbent was coated with the inorganic acid limited in the present invention, the effect to be achieved in the present invention may be sufficiently derived.

In addition, according to Comparative Example 1, it was found that when the gas adsorbent was applied in a grid pattern, sufficient thermal resistance was not secured on an uncoated portion to deteriorate the physical properties, and thus, it was confirmed that when coating was performed uniformly on the entire area of the porous substrate as in Example 1, the physical properties of the porous composite separator and the battery including the same were improved.

In addition, according to Comparative Example 2, it was confirmed that when a cellulose nonwoven fabric was used as the porous substrate, the puncture strength of the separator was low to significantly lower the stability of the battery.

The porous composite separator according to an exemplary embodiment of the present invention has improved thermal resistance, and thus, may prevent ignition or rupture due to an abnormal phenomenon such as a rapid temperature rise.

In addition, since high temperature storage characteristics and penetration properties of a battery including the porous composite separator are improved, the porous composite separator according to an exemplary embodiment of the present invention may have significantly improved battery safety.

In addition, the porous composite separator according to an exemplary embodiment of the present invention prevents occurrence of an internal short circuit due to damage of the separator in a secondary battery with excellent puncture strength, thereby significantly improving battery safety.

In addition, the porous composite separator according to an exemplary embodiment of the present invention allows selective adsorption of gas under a low moisture content, thereby having a significantly improved gas adsorption amount.

In addition, a battery including the porous composite separator according to an exemplary embodiment of the present invention has very high energy density of a positive electrode active material, thereby having significantly improved battery performance.

Therefore, since a porous composite separator having excellent physical properties and safety even with a higher area and a higher capacity than a conventional separator for a secondary battery, and a battery including the composite separator may be provided, the present invention may be introduced in order to improve performance such as thermal stability and electrical properties of a large lithium secondary battery applied to electric vehicles and the like.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A porous composite separator comprising:
a porous substrate; and
a porous coating layer formed by coating one or both surfaces of the porous substrate with a slurry including a gas adsorbent and a binder,
wherein the gas adsorbent is coated or adsorbed with an inorganic acid, and
wherein a content of the inorganic acid relative to a weight of the gas adsorbent is 0.1 to 5 wt %.

2. The porous composite separator of claim 1, wherein the inorganic acid is any one or a mixture of two or more selected from inorganic acids including fluorine, sulfur, and nitrogen.

3. The porous composite separator of claim 1, wherein the gas adsorbent is any one or a mixture of two or more selected from porous carbon materials, porous metal organic frameworks, porous silica gel, and zeolites.

4. The porous composite separator of claim 1, wherein an average size of the gas adsorbent is 5 μm or less.

5. The porous composite separator of claim 1, wherein an average pore size of the gas adsorbent is 50 nm or less.

6. The porous composite separator of claim 1, wherein a specific surface area of the gas adsorbent by BET measurement is 50 $m^2/g$ or more.

7. The porous composite separator of claim 1, wherein a $CO_2$ adsorption amount of the gas adsorbent measured at 25° C. under 1 atm is 50 cc/g or more.

8. The porous composite separator of claim 1, wherein the porous coating layer is applied on 80% or more of an area of the porous substrate.

9. The porous composite separator of claim 1, wherein the binder is any one or a mixture of two or more selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, and polyvinyl alcohol.

10. The porous composite separator of claim 1, wherein the porous composite separator has a thickness of 5 to 100 μm.

11. The porous composite separator of claim 1, wherein the porous composite separator has a thermal shrinkage measured at 150° C. of 5% or less.

12. The porous composite separator of claim 1, wherein the porous composite separator has a puncture strength of 420 gf or more as measured in accordance with a measurement method of ASTM D3763-02.

13. The porous composite separator of claim 1, wherein a number of charge and discharge cycles until SOH of a battery including the porous composite separator is 70% is 1000 or more.

14. A lithium secondary battery comprising the porous composite separator of claim 1.

15. The lithium secondary battery of claim 14, wherein an energy density of a positive electrode active material of the lithium secondary battery is 400 Wh/g or more.

16. The porous composite separator of claim 1, wherein the porous coating layer does not include inorganic particles which are different from the gas adsorbent.

17. The porous composite separator of claim 1, wherein the inorganic acid is any one or a mixture of two selected from inorganic acids including fluorine, and nitrogen.

18. A porous composite separator comprising:
a porous substrate; and
a porous coating layer formed by coating one or both surfaces of the porous substrate with a slurry including a gas adsorbent and a binder,
wherein the gas adsorbent is coated or adsorbed with an inorganic acid including fluorine.

* * * * *